(No Model.)
G. WILKENING.
POISE FOR SCALE BEAMS.
No. 466,641. Patented Jan. 5, 1892.
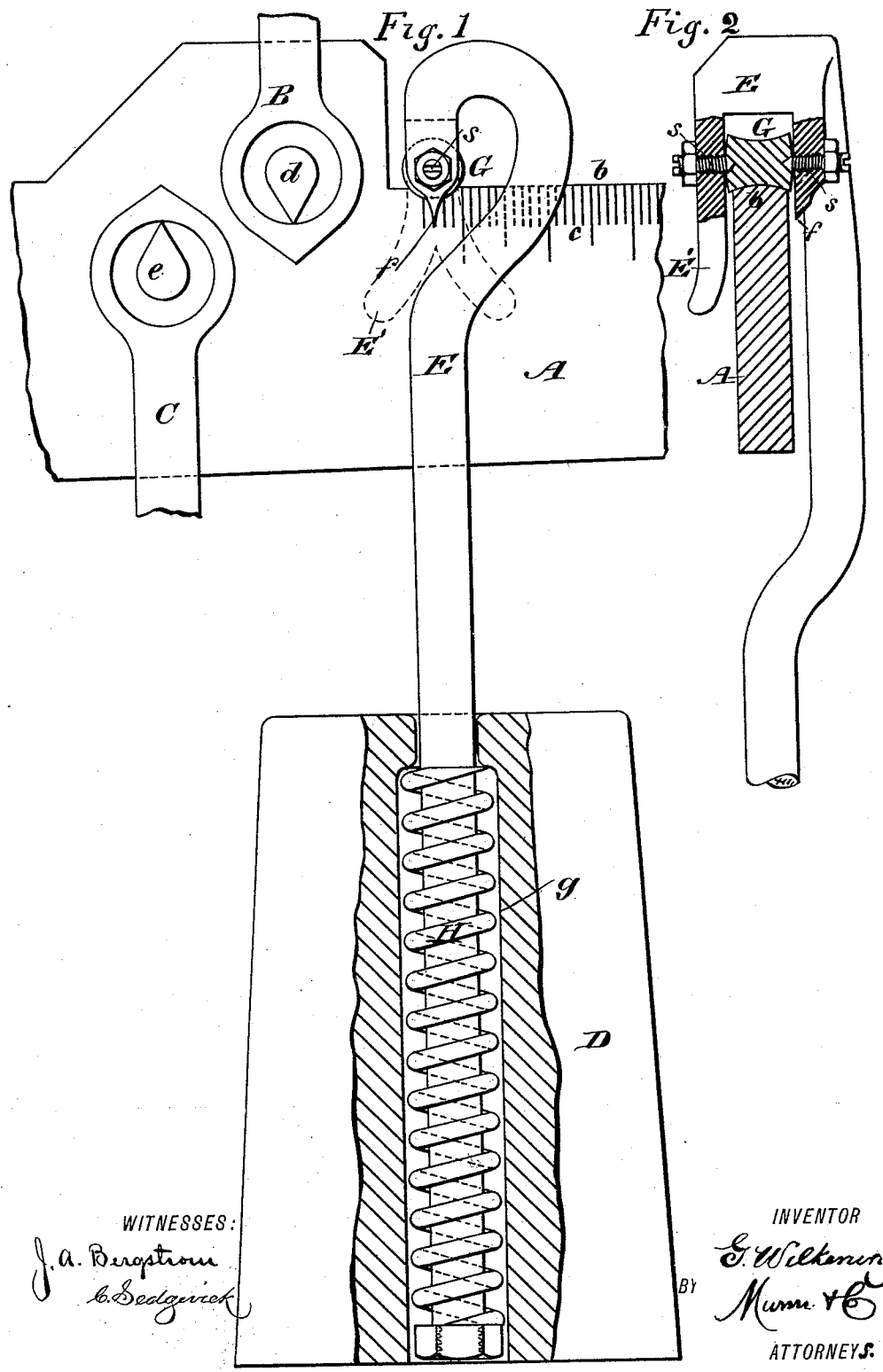
WITNESSES:
J. A. Bergstrom
C. Sedgwick
INVENTOR
G. Wilkening
BY Munn & Co.
ATTORNEYS.

UNITED STATES PATENT OFFICE.

GUSTAV WILKENING, OF HOUSTON, TEXAS.

POISE FOR SCALE-BEAMS.

SPECIFICATION forming part of Letters Patent No. 466,641, dated January 5, 1892.

Application filed October 22, 1891. Serial No. 409,486. (No model.)

*To all whom it may concern:*

Be it known that I, GUSTAV WILKENING, of Houston, in the county of Harris and State of Texas, have invented a new and useful Improvement in Poises for Scale-Beams, of which the following is a full, clear, and exact description.

This invention relates to poises for scale-beams or steelyards which are made smooth on their upper surface for the poise or its suspending attachment to move on when being adjusted to weigh; and the invention consists in a novel construction of said poise, including its suspension and indicating attachments or parts, substantially as hereinafter described, and specifically pointed out in the claims.

Reference is to be had to the accompanying drawings, forming a part of this specification, in which similar letters of reference indicate corresponding parts in both the figures.

Figure 1 represents a side view of a scale-beam, its suspension or fulcrum link, and platform or weighing link in part, with the body of the poise in partial section, together with a hook and roller for suspending and adjusting the poise on and along the beam and attached indicator for indicating on the scale of the beam the weight of the article or goods being weighed. Fig. 2 is a partial sectional elevation of the poise-hook in part, with its suspension and indicating attachment, also showing the scale-beam in transverse section.

A indicates the beam, made with a smooth or unbroken top $b$, and with a scale $c$ on its side.

B is the suspension or fulcrum link of the beam, in which the knife-edge portion $d$ of the latter rests and rocks, and C is the platform or weighing link suspended on or from a knife-edge projection $e$ on the beam.

D is the adjustable weight or poise proper, and E its suspension-hook, which may be either of heart, or, as shown, of half-heart shape on its upper end that straddles the beam. The rear portion of the upper end of the hook is formed with diverging members E', as shown in Fig. 1, so as to give a larger bearing-surface and prevent the hook from twisting on the beam A. Said upper end of the hook is fitted with a roller G, adapted to rest and roll upon the upper surface or top $b$ of the beam, which is preferably slightly convex in transverse section and the roller made concave to fit it, so as to secure a straight and easy rolling action. Pointed screws $s$ $s$ in opposite sides of the nose or upper end of the hook serve to carry and center this roller, and on the front side of the hook at the forward end of the roller is an indicator or pointer $f$, arranged to project below the center of the roller and to register with the scale $c$ on the beam, said pointer always being direct on the mark or division it indicates and in open sight all along the beam. The shank of the hook is extended to form a rod which projects down within or through a hole $g$ in the poise and carries a spring H, that serves to elastically support the weight or poise on the rod or hook.

The easy sliding of the poise and hook-carrying roller on the beam saves much time in weighing and prevents the cutting and marking of the beam, as so often occurs when using the ordinary knife-edge hook; also, the roller-carried poise will always indicate correct weight, as it cannot be adjusted above or below the level on the smooth top beam, and the pointer shows direct to the mark or division in the scale on the beam. The extension of the shank or rod portion of the hook through the weight enables the latter to be easily handled, while the spring on the rod inside of the weight or poise prevents any jar on the beam or hook. By arranging said spring within the weight, as shown, it is protected from damage.

Having thus described my invention, I claim as new and desire to secure by Letters Patent—

1. In poises for smooth-top scale-beams, the hook which carries the poise provided at its upper or nose end with an intervening roller supported at its opposite ends by pointed screws and forming the running-bearing for the poise on the smooth upper surface of the beam, also provided with a front pointer or indicator arranged to project below the center of the roller, substantially as described.

2. In poises for scale-beams, the combination, with the poise or weight and its suspension-hook, of a spring applied to the latter and arranged to carry the weight, substantially as set forth.

3. In poises for scale-beams, the combination, with the poise or weight, of the suspension-hook thereto extending below to form a rod which projects through the weight, and a spring applied to said rod within the weight and serving to bear or carry the weight, substantially as described.

GUSTAV WILKENING.

Witnesses:
J. C. PESCHKA,
OTTO PREUSSNER.